United States Patent
Herrfurth

(10) Patent No.: US 7,360,751 B2
(45) Date of Patent: Apr. 22, 2008

(54) MAGNET UNIT

(75) Inventor: Werner Herrfurth, Westerhausen (DE)

(73) Assignee: Mertik Maxitrol GmbH & Co. KG, Thale (DE)

( * ) Notice: Subject to any disclaimer, the term of this patent is extended or adjusted under 35 U.S.C. 154(b) by 0 days.

(21) Appl. No.: 11/428,121

(22) Filed: Jun. 30, 2006

(65) Prior Publication Data

US 2007/0001141 A1   Jan. 4, 2007

(30) Foreign Application Priority Data

Jun. 30, 2005   (DE) ...................... 10 2005 030 417

(51) Int. Cl.
*F16K 31/02* (2006.01)

(52) U.S. Cl. ........................... 251/129.16; 251/129.15; 335/299

(58) Field of Classification Search ........... 251/129.15, 251/129.16; 335/299
See application file for complete search history.

(56) References Cited

U.S. PATENT DOCUMENTS

| | | | | |
|---|---|---|---|---|
| 5,188,336 A | * | 2/1993 | Graner et al. | 251/129.16 |
| 5,417,403 A | * | 5/1995 | Shurman et al. | 251/129.16 |
| 6,131,880 A | * | 10/2000 | Hahn et al. | 251/129.16 |
| 6,220,569 B1 | * | 4/2001 | Kelly | 251/129.08 |
| 6,578,536 B1 | * | 6/2003 | Donohue et al. | 123/90.18 |

* cited by examiner

*Primary Examiner*—John K. Fristoe, Jr.
(74) *Attorney, Agent, or Firm*—Howard & Howard Attorneys, P.C.

(57) ABSTRACT

A magnet unit is provided with a solenoid with a coil whose core is attached in a recess on the front side of a base, with a movable anchor activated by a recoil spring with a valve closing element and with a protective cap attached on a shoulder of the base within which the anchor and the solenoid are located, with a first end of the coil of the solenoid being led to a connecting contact located on the other front side of the base, the shoulder having, on its side facing away from the base, a circumferential annular flange located inside the protective cap, enclosing and protruding over the front surface of the shoulder and a second end of the coil being attached on the front surface.

9 Claims, 4 Drawing Sheets

A-A

MAGNET UNIT

CROSS-REFERENCE TO RELATED APPLICATION

The instant application claims priority to German Patent Application Serial No. 10 2005 030 417.6, filed Jun. 30, 2005, the entire specification of which is expressly incorporated herein by reference.

FIELD OF THE INVENTION

The invention relates to a magnet unit, designed particularly for thermoelectric flame failure devices on gas-fired appliances.

BACKGROUND OF THE INVENTION

There are a great number of different versions of magnet units, particularly for thermoelectric flame failure devices on gas-fired appliances. Their function is to switch off the flow of gas to a burner as soon as the gas flame on the burner is extinguished for any reason. What happens essentially in such a case is that a thermoelement forming part of the flame failure device ceases to be heated. This cuts off the electricity supply to a solenoid forming part of the magnet unit and causes a gas valve to be closed.

The published patent application DE 12 17 896 A describes a magnet unit for a thermoelectric flame failure device consisting of an anchor plate connected to a valve plunger and a solenoid with a coil that is held on a supporting plate. On the outer side of the supporting plate there is an electrical contact head connected to one end of the field coil which is electrically insulated from the supporting plate and around whose peripheral area a protective cap is attached enclosing the anchor plate and the magnet. The other end of the field coil is attached between the protective cap and the peripheral area of the supporting plate.

A version of a safety gas valve with electromagnetic coupling is known from utility model patent application DE 200 04 755 U1. This has basically a similar structure to the magnet unit already described above. Here too one end of the coil wire inside the supporting plate, termed the base in this case, is led to a contact which is also electrically insulated from the base. The other end of the coil wire is connected to an additional ground wire which is electrically welded on the periphery of an annular bulb on the base.

In both these versions it is disadvantageous if one end of the coil gets pressed between the protective cap and the peripheral area of the supporting plate. This causes the protective cap to fail to sit evenly and become distorted at that point. Apart from the resulting gap through which dirt can penetrate into the area enclosed by the protective cap, thus impairing the function of the magnet unit, the tightness of fit of the protective cap is weakened.

In another version of a magnet unit, as described in DE 19 59 057 A, a patent application open to public inspection, the coil of the solenoid is positioned on a coil former fitted with two feet with which the coil former is pushed onto two power lead pins which are electrically insulated and extend through the supporting plate into the inside of the magnet unit. The ends of the coil are united in slots in the power lead pins and soldered.

While an even sit of the protective cap is achieved with this magnet unit, the solution is very costly and thus not very suitable for series production.

With other known magnet units, as described, for example, in the German patent specifications DE 22 14 063 C3 or DE 23 54 014 C3, one end of the coil is electrically conductively connected with a soldered connection of a soldering bulb which is electrically insulated and extends through the supporting plate. The other end of the coil is soldered on the upper side of the supporting plate.

Apart from the comparatively complicated structure, it is difficult, especially when taking into account the actual proportions, to position the soldering joint on the upper side of the supporting plate and to carry out the soldering without weakening the firmness of the sit of the plastic cap on the supporting plate. Whilst subsequent rework is conceivable, it is not an ideal solution because of the expense involved, especially in series production.

SUMMARY OF THE INVENTION

A new and improved magnet unit is provided. More specifically, a magnet unit is provided in which the ends of the coil of the solenoid are attached without their colliding with the protective cap.

In accordance with the general teachings of the present invention, a magnet unit is provided with a solenoid (9) whose core (8) is attached in a recess (6) on the front side of a base (1) and with a protective cap (3) attached on a shoulder (2) of the base (1), with a first end (23) of the coil (20) of the solenoid (9) led to a connecting contact (24) located on the other front side of the base (1), the shoulder (2) has on its side facing away from the base (1) a circumferential annular flange (21) which is located inside the protective cap (3) and encloses and protrudes over the front surface (22) of the shoulder (2), on which the second end (27) of the coil (20) is attached.

The magnet unit can be used in the thermoelectric flame failure devices of gas-fired appliances.

DETAILED DESCRIPTION OF THE INVENTION

The invention was developed as a means of addressing the problem arising in magnet units of the type named in the introduction, which is to ensure that the ends of the coil of the solenoid are attached without their colliding with the protective cap, thus avoiding any necessary rework to achieve that end.

In accordance with the invention the problem is solved in that in a magnet unit with a solenoid with a coil whose core is attached in a recess on the front side of a base, with a movable anchor activated by a recoil spring with a valve closing element and with a protective cap attached on a shoulder of the base within which the anchor and the solenoid are located, with a first end of the coil of the solenoid being led to a connecting contact located on the other front side of the base, the shoulder has on its side facing away from the base a circumferential annular flange located inside the protective cap, enclosing and protruding over the front surface of the shoulder and that a second end of the coil is attached on the front surface.

The above design has provided a solution eliminating the disadvantages in the current state of technology previously referred to above. The annular flange ensures that no collision occurs between the protective cap and the other end of the coil and any possible accumulations of material occurring during attachment. What is remarkable about this solution is the simplicity of its structure and mode of action.

Additional designs of the invention are depicted in the other patent claims. For example, the second end of the coil can be welded or soldered on the front surface. What is particularly advantageous in these versions is that there is no need for alignment between the two parts to be connected.

Another advantageous design can be produced by pressing the second end of the coil in a radial groove made in the front surface, the width of such a groove being marginally smaller than the thickness of wire of the second end of the coil. During this process the coating on the wire is scraped off at the same time, ensuring that the necessary electrical connection can be made without additional rework.

In addition, this design can be further optimized in production terms if one or more radial grooves on the front surface are not made until the core has been united, with the material being moved radially inwards in such a way that the projections formed in the process fix the core of the solenoid at the same time in the front side of the recess.

Figure 1:
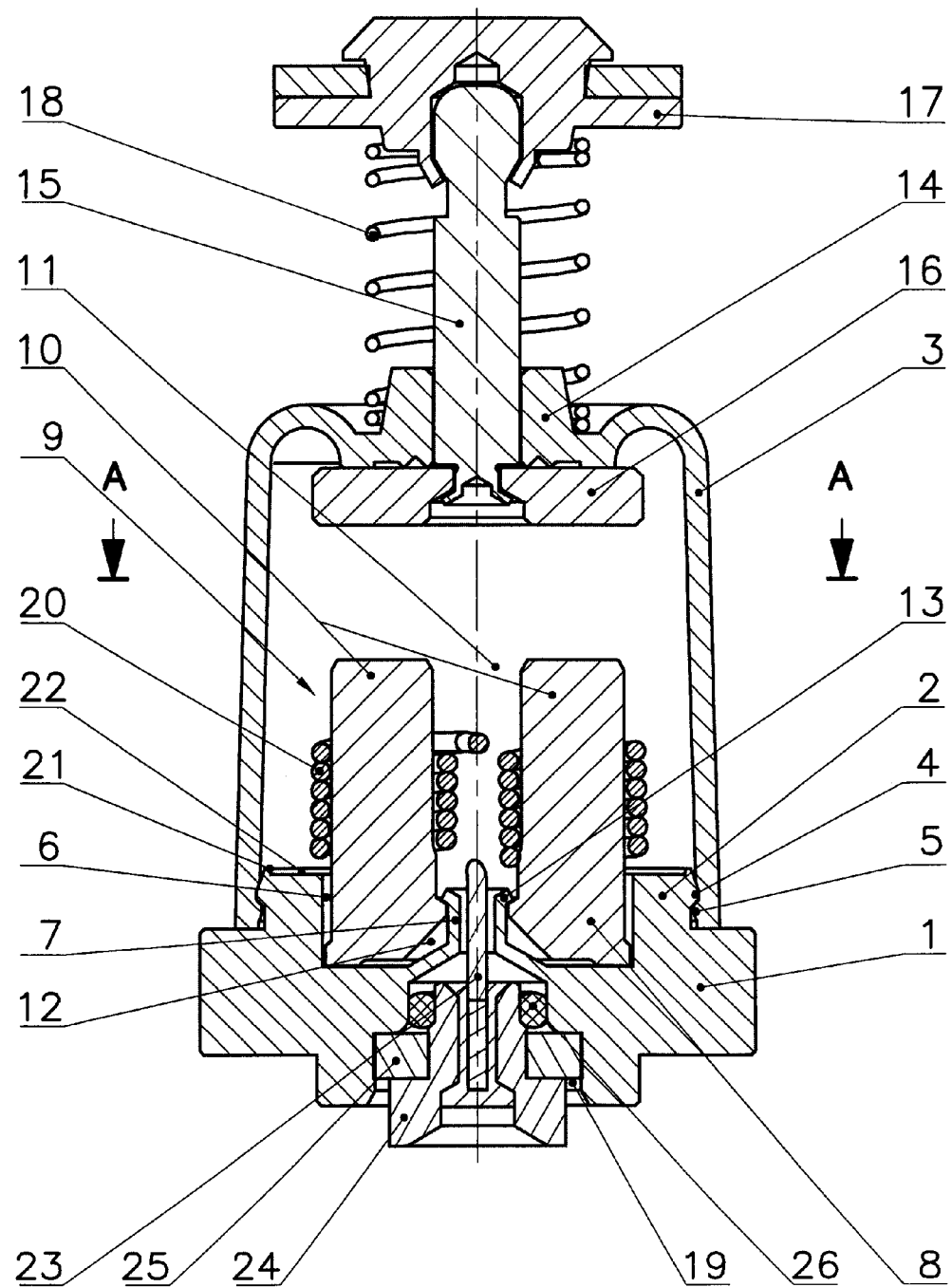
FIG. 1 illustrates a sectional view of a first embodiment of a magnet unit.

The initial design shown in FIG. 1 of a magnet unit in accordance with the invention has a base 1 which can be united gas-tightly into a receptacle of a housing of a gas appliance which is not illustrated. On its side extending into the inside of the housing the base 1 has a shoulder 2 on which a cup-shaped protective cap 3 is placed. In order to secure a stable and tight connection to prevent the penetration of dirt particles and the like, the shoulder 2 has in addition the advantage of a circumferential bulb 4 which snaps into place after a circumferential catch 5 on the protective cap 3 has passed over it as the cap is put on. Within the protective cap 3 the base 1 has on its front side a recess 6 in whose center a pin 7 protrudes with an opening 19 extending to the outer side of the base 1. On its side facing away from the base 1 the shoulder 2 has a circumferential annular flange 21 located inside the protective cap 3, enclosing and protruding over the front surface 22 of the shoulder 2.

A U-shaped core 8 of a solenoid 9 is positioned in the recess 6 in such a way that both limbs of the magnet 10 run in a longitudinal direction to the protective cap 3. In the slot 11 formed by the two limbs 10 the core 8 has an aperture 12 through which the pin 7 protrudes and fixes the core 8 in position by means of its flanged edge 13.

The wall of the protective cap 3 opposite the base 1 is formed as a receptacle 14 in which a plunger 15 stored coaxially to the protective cap 3 can be moved longitudinally. The plunger 15 is connected at its end extending into the inside of the protective cap 3 with an anchor 16 whereas its end located outside the protective cap 3 carries a valve closing element 17. On the protective cap 3 there rests a recoil spring 18 which pushes the valve closing element 17 in the direction of an associated valve seat which is not illustrated.

Figure 2:
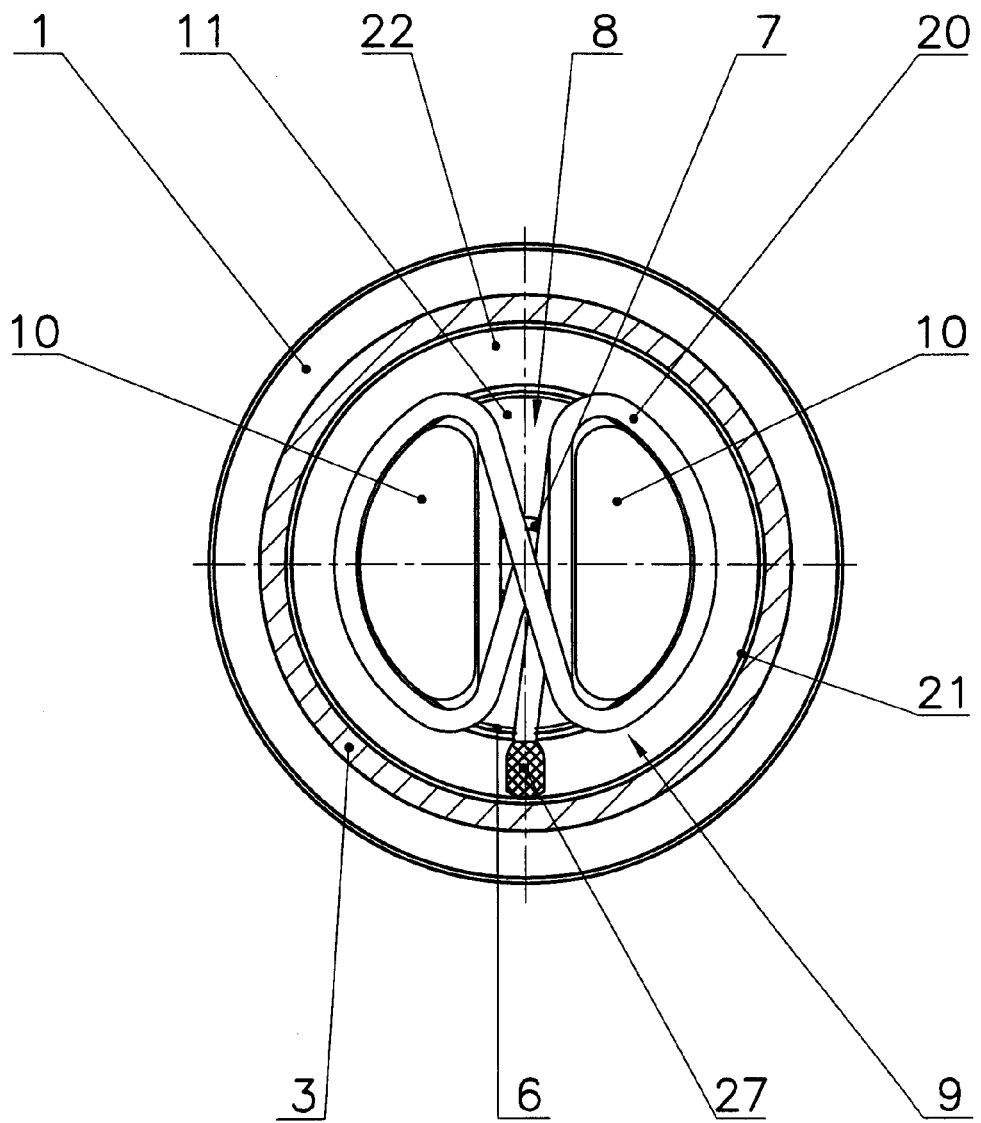
FIG. 2 illustrates a sectional view taken along line A-A of the magnet unit depicted in FIG. 1.

As shown in FIG. 2, a coil 20 is wound on both limbs 10. The first end 23 of the coil 20 is led through the opening 19 on the base 1 and electrically conductively connected with a connecting contact 24, for example by a soldered joint. The connecting contact 24 is pressed into an insulator 25 which in its turn is pressed again into the base 1. In order to ensure the necessary gas tightness, an O-Ring 26 is fitted within the opening 19 between the base 1 and the connecting contact 24.

The second end 27 of the coil 20 is led from the core 8 to the front surface 22 where it is attached, for example, by welding or soldering. What is advantageous here when assembling the device is that there is no need for alignment between the two parts to be connected. At the same time the annular flange 21 serves as a stop for the second end 27 of the coil 20 to prevent these two parts colliding with each other during the fitting of the protective cap 3. In addition, the annular flange 21 also keeps out any accumulations of material that may arise during attachment that could also otherwise penetrate as far as the area of the protective cap 3.

Figure 3:
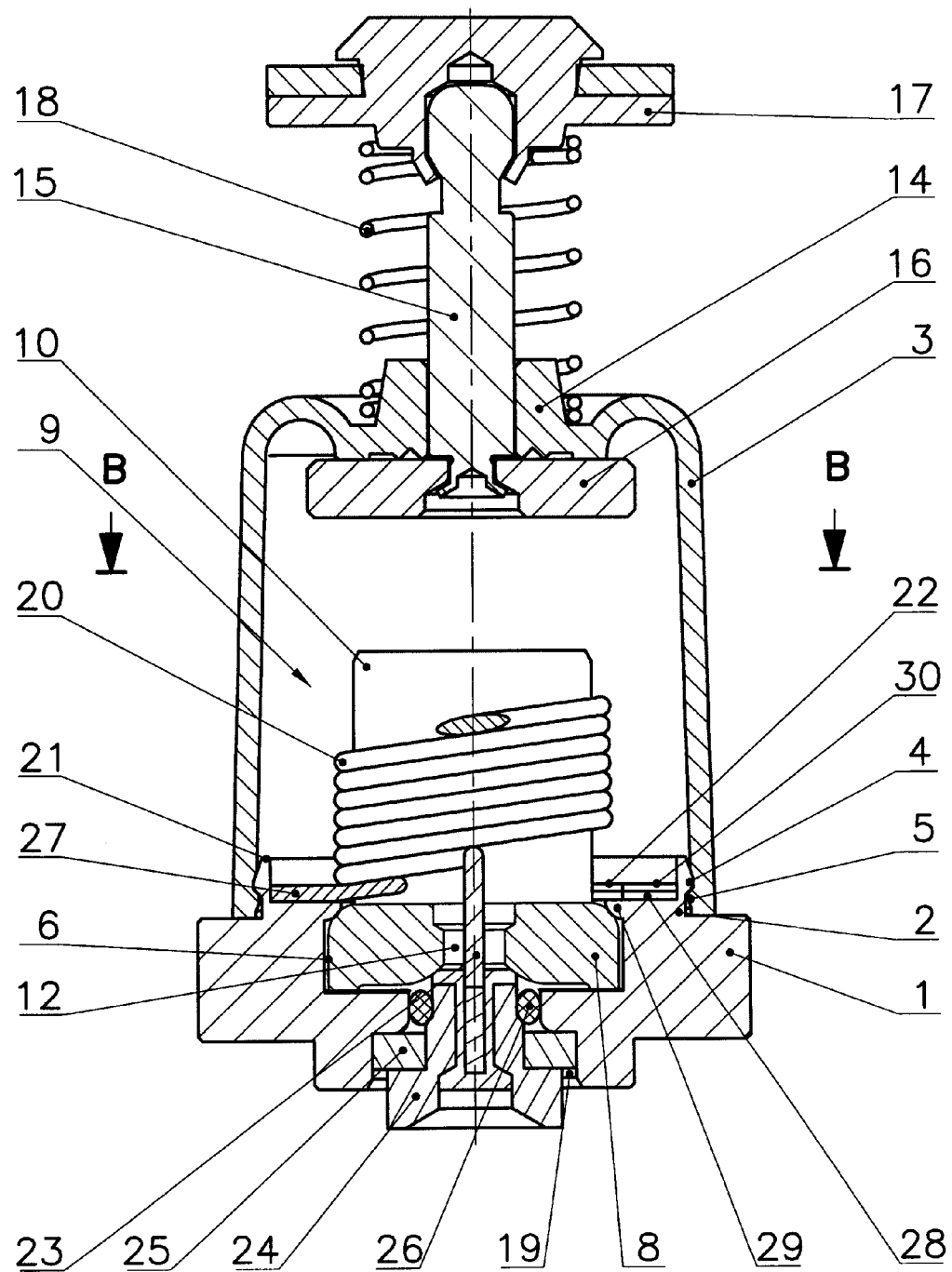
FIG. 3 illustrates a sectional view of a second embodiment of a magnet unit.
Figure 4:
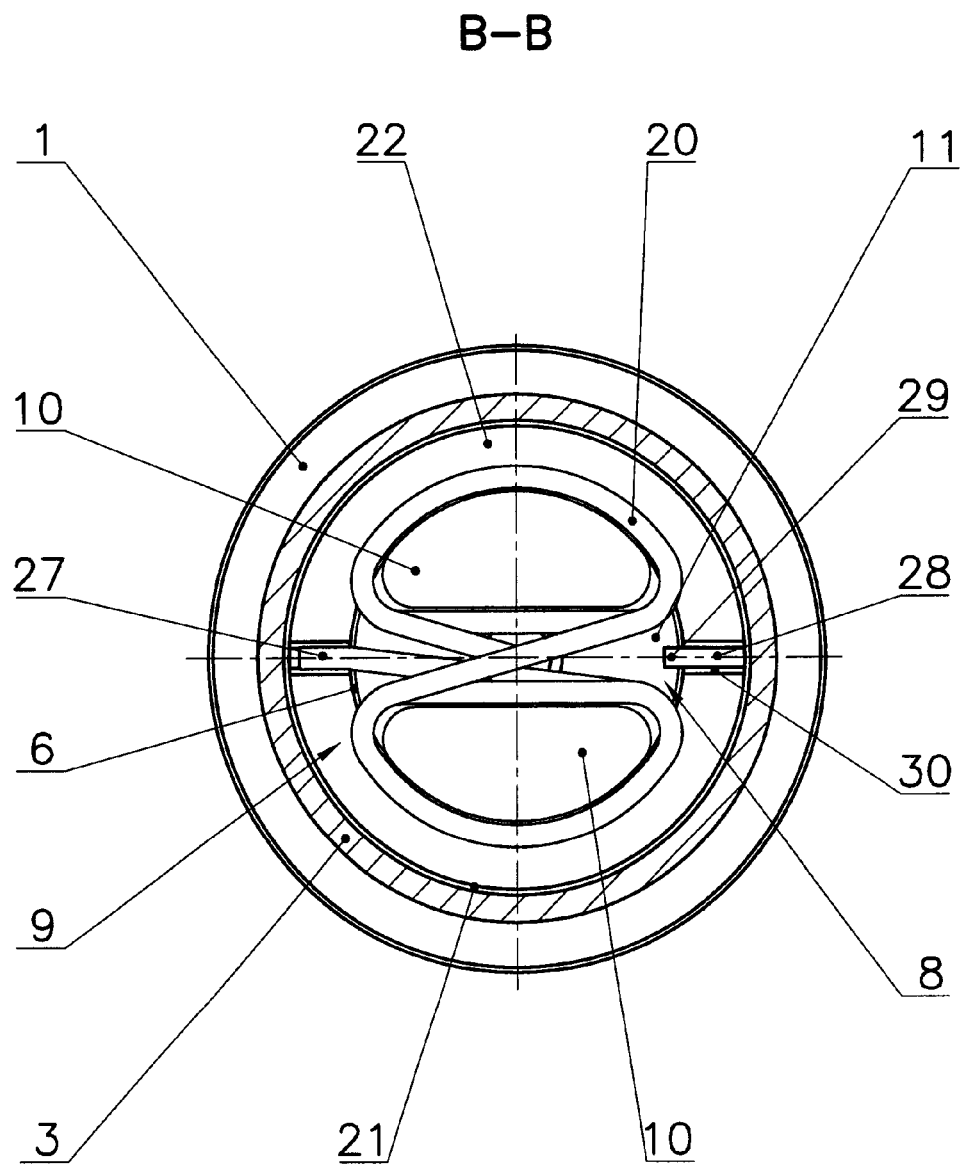
FIG. 4 illustrates a sectional view taken along line B-B of the magnet unit depicted in FIG. 3.

In FIG. 3 a different magnet unit is shown from the design in FIG. 1 though its basic structure is the same. Here too the base 1 has a shoulder 2 on which a cup-shaped protective cap 3 is placed. Within the protective cap 3 the base 1 also has a recess 6 on the front side in whose center an opening 19 is located extending to the outer side of the base 1. On its side facing away from the base 1 the shoulder 2 here also has a circumferential annular flange 21 located within the protective cap 3, enclosing and protruding over the front surface 22 of the shoulder 2. In the recess 6 the U-shaped core 8 is also so positioned in the recess 6 that both limbs 10 run longitudinally in the direction of the protective cap 3. In the slot 11 formed by the two limbs 10 the core 8 also has an aperture 12 through which the first end 23 of the coil 20 is led and electrically conductively connected with a connecting contact 24.

In this execution example the front surface 22 has two radial grooves 28. It goes without saying that the number of grooves 28 can be varied as required, with the material moved inwards radially after the unition of the core 8 in such a way that the projections 29 formed in the process fix the core 8 at the same time in the front side of the recess 6.

The second end 27 of the coil 20 is then pressed into one of the radial grooves 28 made on the front surface 22, the width of such grooves being marginally smaller than the thickness of the wire of the second end 27. An inlet bevel 30 proves helpful here. The coating on the wire is scraped off in this process at the same time so that the necessary electrical connection is ensured without additional rework.

Here too the annular flange 21 serves as a stop for the second end 27 of the coil to prevent a collision between the protective cap 3 and the second end 27.

What is claimed is:

1. A magnet unit for use with thermoelectric flame failure devices on gas-fired appliances, the magnet unit including a solenoid (9) with a coil (20), wherein a core (8) is attached in a recess (6) on the front side of a base (1) and a movable anchor (16) is activated by a recoil spring (18) that is linked with a valve closing element (17), and with a protective cap (3) attached on a shoulder (2) of the base (1) within which the anchor (16) and the solenoid (9) are located, with a first end (23) of the coil (20) of the solenoid (9) led to a connecting contact (24) located on the other front side of the base (1), comprising:

the shoulder (2), on its side facing away from the base (1), having a raised circumferential annular flange (21) which is located inside the protective cap (3), enclosing and protruding over a front surface (22) of the shoulder (2) and that a second end (27) of the coil (20) is attached on the front surface (22), the annular flange

(21) extending over the second end (27) to prevent contact between the second end (27) and the protective cap (3).

2. A magnet unit according to claim 1, wherein the second end (27) of the coil (20) is welded on to the front surface (22).

3. A magnet unit according to claim 1, wherein the second end (27) of the coil (20) is soldered on to the front surface (22).

4. A magnet unit according to claim 1, wherein the second end (27) is received within an area defining a groove (28) formed on the front surface (22).

5. A magnet unit according to claim 4, the groove (28) having a first width, the second end having a second width, the first width being less than the second width.

6. A magnet unit for use with thermoelectric flame failure devices on gas-fired appliances, the magnet unit including a solenoid (9) with a coil (20), wherein a core (8) is attached in a recess (6) on the front side of a base (1) and a movable anchor (16) is activated by a recoil spring (18) that is linked with a valve closing element (17), and with a protective cap (3) attached on a shoulder (2) of the base (1) within which the anchor (16) and the solenoid (9) are located, with a first end (23) of the coil (20) of the solenoid (9) led to a connecting contact (24) located on the other front side of the base (1), comprising:

the shoulder (2), on its side facing away from the base (1), having a circumferential annular flange (21) which is located inside the protective cap (3), enclosing and protruding over a front surface (22) of the shoulder (2) and that a second end (27) of the coil (20) is attached on the front surface (22), the second end (27) being received within an area defining a groove (28) formed on the front surface (22).

7. A magnet unit according to claim 6, the groove (28) having a first width, the second end having a second width, the first width being less than the second width.

8. A magnet unit according to claim 6, wherein the second end (27) of the coil (20) is welded on to the front surface (22).

9. A magnet unit according to claim 6, wherein the second end (27) of the coil (20) is soldered on to the front surface (22).

* * * * *